United States Patent [19]

Lee et al.

[11] Patent Number: 4,705,645

[45] Date of Patent: * Nov. 10, 1987

[54] METHOD FOR PREPARING AN ELECTRICALLY CONDUCTIVE POLYMER BLEND

[75] Inventors: Kang I. Lee, St. Louis, Mo.; Harriet Jopson, Dover, Mass.

[73] Assignee: GTE Laboratories Incorporated, Waltham, Mass.

[ * ] Notice: The portion of the term of this patent subsequent to Oct. 7, 2003 has been disclaimed.

[21] Appl. No.: 684,493

[22] Filed: Dec. 21, 1984

Related U.S. Application Data

[62] Division of Ser. No. 554,610, Nov. 23, 1983, Pat. No. 4,510,075.

[51] Int. Cl.$^4$ .............................................. H01B 1/20
[52] U.S. Cl. .................................. 252/500; 252/511; 525/202; 525/247; 525/275; 525/328.1; 526/285
[58] Field of Search ................ 252/500, 511; 525/202, 525/275, 328.1, 247; 526/285

[56] References Cited

U.S. PATENT DOCUMENTS

| | | | |
|---|---|---|---|
| 4,222,903 | 9/1980 | Heeger et al. | 252/500 |
| 4,394,304 | 7/1983 | Wnek | 252/520 |
| 4,411,826 | 10/1983 | Naarmann et al. | 526/285 |
| 4,616,067 | 10/1986 | Lee et al. | 525/202 |

FOREIGN PATENT DOCUMENTS

| | | | |
|---|---|---|---|
| 120715 | 9/1981 | Japan . | |
| 164579 | 10/1982 | Japan | 526/285 |
| 172539 | 9/1984 | Japan | 525/275 |

OTHER PUBLICATIONS

Day et al., "Synthesis and Characterization of Poly(1,-11-Dodecadiyne) and Related Polymers," J. Polym. Sci.: Polym. Lett. Ed., vol. 19, No. 5, 227-233 (1981).
Rubner et al., "Structure-Property Relationships of Polyacetylene/Elastomer Blends," Org. Coat. Appl. Polym. Sci. Proc., 1983, 48, 544-547 (CA 100: 112810).
"Organic Metals and Semiconductors: The Chemistry of Polyacetylene, $(CH)_x$, and its Derivatives," by MacDiarmid and Heeger, Synthetic Metals, 1 (1979/79), pp. 101-118.
"Electrically Conductive Polymer Composites: Polymerization of Acetylene in Polyethylene," by Galvin and Wnek, Polymer Communications, 1982, vol. 23, Jun., pp. 795-797.
"Structure-Property Relationships of Polyacetylene/Polybutadiene Blends," by Rubner et al., Macromolecules, vol. 16, No. 6, 1983, pp. 870-875.
"Electrically Conducting Acetylene-Methylacetylene Copolymers. Synthesis and Properties", by Chien et al., Macromolecules, vol. 14, No. 3, May-Jun. 1981, pp. 479-485.
"Thermal Cis-Trans Isomerization and Decomposition of Polyacetylene", by Ito et al., Journal of Polymer Science, vol. 13, 1943-1950 (1975), pp. 1943-1950.
"Raman Scattering and Electronic Spectra of Poly(acetylene)", by Shirakawa et al., Polymer Journal, vol. 4, No. 4, pp. 460-462 (1973).
"Simultaneous Polyumerization and Formation of Polyacetylene Film on the Surface of Concentrated Soluble Ziegler-Type Catalyst Solution", by Ito, et al., Journal of Polymer Science, vol. 12, 11-20 (1974), pp. 11-20.
"Infrared Spectra of Poly(acetylene)", by Shirakawa et al., Polymer Journal, vol. 2, No. 2, pp. 231-244 (1971).
"Electrical Properties of Linear Polyacetylene", by Berets et al., Trans. Faraday Soc., 64, 823-828 (1968).
"Investigation of the Electrical Conductivity of Iodinated Polyphenylacetylene", by Cukor et al., Polym. Prep., Am. Chem. Soc. Div. Polym. Chem., 1980, vol. 21, pp. 161-162.
"Stability and Stabilization of Polyacetylene, Polyphenylacetylene, and Acetylene/Phenylacetylene Copolymers", by Deits et al., Synthetic Metals, 4 (1982), pp. 199-210.

Primary Examiner—Robert A. Wax
Attorney, Agent, or Firm—Hamilton, Brook, Smith & Reynolds

[57] ABSTRACT

Electrically conductive polymer blends of an acetylene polymer and an elastomer having a low level of unsaturation are disclosed herein. The low level of unsaturation provides resistance to heat, light, oxygen and ozone and yet provides sufficient sites for crosslinking of the blend to provide increased stability. These blends exhibit high conductivity upon doping with electron donors or electron acceptors.

13 Claims, 1 Drawing Figure

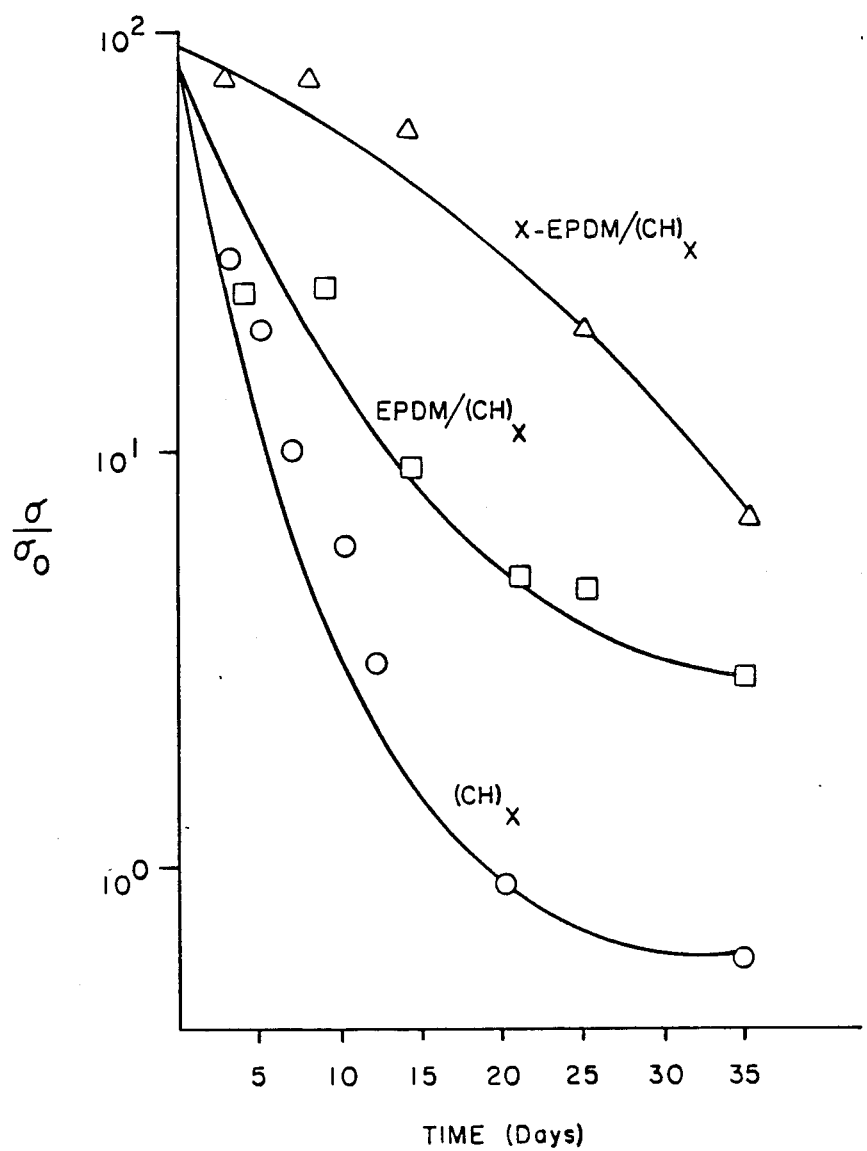

METHOD FOR PREPARING AN ELECTRICALLY CONDUCTIVE POLYMER BLEND

RELATED APPLICATION

This application is a divisional of Ser. No. 554,610, filed Nov. 23, 1983 now U.S. Pat. No. 4,510,075.

DESCRIPTION

1. Technical Field

This invention is in the field of polymer chemistry and more specifically relates to electrically conductive polymer blends of an acetylene polymer and an elastomer having low unsaturation.

2. Background Art

Polyacetylene, $(CH)_x$, is the simplest possible conjugated organic polymer. Because of this fundamental nature, polymers of acetylene have always held special interest to polymer chemists. This interest was heightened when it was found that the electrical conductivity of poly(acetylene) could be significantly enhanced by doping the polymer with electron acceptors. See Berets et al., *Trans. Faraday Soc.*, 64 823-8 (1968).

The first polymers of acetylene were prepared in powder form. Subsequently, however, Shirakawa and others succeeded in synthesizing lustrous, silvery, polycrystalline films of poly(acetylene), and developed techniques for controlling the cistrans content of such films. See H. Shirakawa and S. Ikeda, *Polym. J.*, 2 (1971) 231; H. Shirakawa, T. Ito and S. Ikeda, *Polym. J.*, 4 (1973) 460; T. Ito, H. Shirakawa and S. Ikeda, *J. Polym. Sci., Polym. Chem. Ed.*, 12 (1974) 11; and T. Ito, H. Shirakawa and S. Ikeda, *J. Polym. Sci., Polym. Chem. Ed.*, 13 (1975) 1943.

Continued work by Shirakawa resulted in the discovery that the polycrystalline film could be doped with electron acceptors to markedly increase electrical conductivity of such films to levels characteristic of or approaching the conductivities of metals. See U.S. Pat. No. 4,222,903 to Shirakawa et al. In fact, it has now been demonstrated that chemical or electrochemical doping with electron donors or electron acceptors can increase the electrical conductivity of polycrystalline films of poly(acetylene) by over 12 orders of magnitude. Thus, the electrical conductivity of these films can range from that of an insulator ($10^{-10}$ ohm$^{-1}$ CM$^{-1}$) to that of a semiconductor, to that of a metal ($10^3$ ohm$^{-1}$ cm$^{-1}$). See *Synthetic Metals* 1, 101-118 (1979/80) Elsevier Sequora S. A., Lausanne.

Unfortunately, poly(acetylene) has poor mechanical and physical properties. It is, for example, insoluble, intractable and infusable, making it difficult or impossible to process. Additionally, although polyacetylene film remains reasonably flexible if maintained in an inert atmosphere, it quickly becomes brittle upon exposure to ambient conditions.

Because of the potential offered by the unique electrical properties, much effort has been devoted to improving the mechanical and physical properties of polymers based upon acetylene. For example, substituted analogs of acetylene, such as methylacetylene and phenylacetylene, have been polymerized in the form of polycrystalline films. While these polymers of substituted acetylenes showed improved mechanical properties, their electrical conductivities were several orders of magnitude smaller than those obtainable for doped poly(acetylene). See Cukor, P., Krugler, J. I. and Rubner, M. F., *Polym. Prep., Am. Chem. Soc. Div. Polym. Chem.*, 1980, 21 161. Poly(phenylacetylene) also showed a much more rapid decrease in electrical conductivity than poly(acetylene); in fact, catastrophic failure of poly(phenylacetylene) was found to occur in less than 250 hours of exposure to ambient conditions. See Deits, W., Cukor, P., Rubner, M. and Jopson, H., "Stability and Stabilization of Polyacetylene, Polyphenylacetylene, and Acetylene/Phenylacetylene Co-polymers," *Synthetic Metals*, 4 (1982) 199-210.

Previous research has also focused on efforts to produce co-polymers of acetylene, such as copolymers of acetylene with phenylacetylene or methylacetylene. See Deits, W., Cukor, P., Rubner, M., Jopson, H., *Synthetic Metals*, 4 (1982) 199; and Chien, J. C. W., Wnek, G. E., Karasz, F. E., Hirsch, J. A., *Macromolecules*, 14 (1981), 479. This work was carried out with the hope that the structure of the polymer backbone would result in unaltered electrical properties whereas the side groups would impart processing advantages. While the co-polymers were found to have some processing advantages over the homopolymer, it was unfortunately found that this was accomplished with concomitant significant decreases in electrical conductivity.

Research efforts with acetylene polymers then took another direction and focused upon blends of acetylene with other polymers. One such blend was prepared by polymerizing acetylene in solid low density polyethylene films impregnated with ZieglerNatta catalyst. See Galvin, M. E. and Wnek, G. E., *Polymer* 23 (1982), 795-7. Such blends are also described and claimed in U.S. Pat. No. 4,394,304, issued to Wnek.

In order to introduce the poly(acetylene) into the polyethylene matrix, these researchers employed high polymerization temperatures (e.g., 100°-110° C.) for acetylene. Such high temperatures were necessary to break the crystallinity of the polyethylene so that acetylene could penetrate the polyethylene. Such high polymerization temperatures can lead to side reactions, however, such as crosslinking and chain scission reactions. Also, blends of polyacetylene and polyethylene are still relatively rigid materials because the host polymer polyethylene remains a partially crystalline material.

More recently, blends of polyacetylene with the elastomer, polybutadiene, have been described. See Rubner, M. F., Tripathy, S. K., Georger, J., Jr. and Cholewa, P., "Structure-Property Relationships of Polyacetylene/ Polybutadiene Blends," *Macromolecules*, 16, (1983) 870-5. While polybutadiene and other conventional elastomers, may add flexibility to such blends, they are typically not suitable host polymers for poly(acetylene). This is due to the fact that such polymers contain relatively high levels of unsaturation making them prone to attack by heat, ozone, oxygen, u.v. light, etc. The relatively high levels of unsaturation also allow these blends to undergo further chemical reaction, such as with the poly(acetylene) catalysts during blend preparation.

DISCLOSURE OF THE INVENTION

This invention relates to new electrically conductive polymer blends. These polymer blends are formed from a doped acetylene polymer intimately dispersed within an elastomer having low unsaturation. An example of such an elastomer is the terpolymer, ethylene-propylene-diene (EPDM).

These electrically conductive blends offer several advantages over blends of acetylene polymers previously proposed. For example, the elastomer having low unsaturation affords a material resistant to attack by heat, light, oxygen and ozone. On the other hand, the low level of unsaturation is sufficient to enable the blend to be crosslinked subsequent to its preparation. Such crosslinking stabilizes the blend by preventing molecular movement of the poly(acetylene) chains.

BRIEF DESCRIPTION OF THE FIGURE

The FIGURE is a plot of normalized electrical conductivity versus time of air exposure for poly(acetylene), an uncrosslinked blend of poly(acetylene) and EPDM, and a crosslinked blend of poly(acetylene) and EPDM.

DETAILED DESCRIPTION OF THE INVENTION

Elastomers having low unsaturation are formed from co-polymers of a monoethylenically unsaturated monomer with a diene. After polymerization, the diene provides the low levels of unsaturation required in the elastomer.

A particularly preferred example is ethylene-propylene-diene terpolymer. This terpolymer has ethylidene nobornene as a diene unit. It has a completely saturated hydrocarbon backbone, but contains double bonds located on the side chains. This terpolymer is known to have excellent mixing, extruding and molding characteristics.

Another example of an elastomer having a low level of unsaturation is butyl rubber. Butyl rubber is a co-polymer of isobutylene and isoprene. Still another example is a co-polymer of isobutylene and butadiene.

In general, the elastomer should contain just enough diene to provide the amount of unsaturation in the elastomer to allow for crosslinking. Ethylene-propylene-diene terpolymer, for example, contains less than about 2% unsaturation, which is preferred.

Poly(acetylene) can be introduced into the elastomer by techniques based upon those previously employed in forming blends of poly(acetylene) in other matrices. For instance, the elastomer can be dissolved in a solvent containing a polymerization catalyst. Solvent can then be removed, such as with the aid of a vacuum, to form a film of the elastomer containing catalyst on the walls of the container. Acetylene gas can then be introduced into the container at temperatures sufficient for polymerization to occur within the elastomer.

Alternatively, acetylene gas can be bubbled through the solution of elastomer and films of the polyblend can be subsequently cast from the reaction mixture and dried in vacuum.

Suitable catalysts for acetylene polymerization include Shirakawa catalysts. A suitable Shirakawa catalyst can be formed by mixing 1.7 ml titanium tetrabutoxide, $Ti(OC_4H_9)_4$, and 2.7 ml triethylaluminum, $Al(C_2H_5)_3$, dissolved in 20 ml of toluene.

The temperature of polymerization is controlled so that acetylene diffuses into and polymerizes within the elastomer. Generally, lower temperatures are employed than has been usual in the formation of previously described poly(acetylene) blends. As a general matter, temperatures from about $-78°$ C. up to about room temperature can be employed to form suitable blends according to this invention.

The sites of unsaturation are subsequently employed in crosslinking the blend. Crosslinking was attempted with the chemical crosslinking agent $S_2Cl_2$, but it was found that this treatment was sufficiently harsh to prevent any uptake of iodine during doping. In view of this, it is preferred to use gamma rays, such as from a $^{60}Co$ source. Crosslinking with 30 minutes of gamma radiation (dose rate = $1.32 \times 10^5$ R/minutes) caused EPDM/PA blends to become completely insoluble in almost all hydrocarbon solvents. However, unlike the chemically crosslinked material, the irradiated blend could be doped with iodine to produce a material having enhanced electrical conductivity.

Doping is carried out to a level sufficient to make the blends electrically conductive. For purposes of this invention, electrically conductive means an electrical conductivity of at least about $10^{-6}$ ohm$^{-1}$cm$^{-1}$.

Doping with electron donors or electron acceptors is performed according to art-recognized techniques. Examples of suitable dopants and methods for doping are described in detail in MacDiarmid, A. G. and Heeger, A. J., "Organic Metals and Semiconductor: the Chemistry of Polyacetylene, $(CH)_x$, and its Derivatives," *Synthetic Metals*, 1, (1979–80) 101–18, the teachings of which are hereby incorporated by reference.

Electrical conductivity of films prepared from blends of poly(acetylene) and elastomers containing low levels of unsaturation can be enhanced by stretching the film. This apparently increases the crystallinity of poly(acetylene).

Whereas poly(acetylene) is described above, and the experimental results also employ poly(acetylene), other polymers of acetylene could be employed. These include homopolymers of substituted acetylene, such as poly(methylacetylene) and poly(phenylacetylene). Additionally, co-polymers containing acetylene can also be employed in producing the electrically conducting polymer blends of this invention.

This invention will now be more specifically illustrated by the following examples.

EXAMPLE 1

Preparation of an Electrically-Conducting Blend of Poly(acetylene) and Ethylene-Propylene-Diene (EPDM) Terpolymer Two grams of ethylene-propylene-diene terpolymer (Epcar 346, Polysar Inc.) was dissolved in freshly distilled toluene in a three-necked flask under an argon atmosphere. Two ml of Shirakawa catalyst, $Ti(OC_4H_9)_4/Al(C_2H_5)_3$ in toluene, was added to the flask by means of a syringe. All solvent was then slowly evaporated under vacuum by rotating the flask to ensure a uniform film of the polymer on the wall of the flask. Acetylene gas introduced into the flask at room temperature. Polymerization of acetylene was evident from the color change of the film from brown to black. The flask was filled with acetylene, closed and left overnight at room temperature. The reaction flask was then flushed with argon to remove monomer residue and the film was washed with freshly degased heptane at low temperature. The film was peeled from the sides of the flask, subsequently dried overnight under vacuum, and doped with iodine vapor overnight.

The film produced was quite homogeneous and had excellent flexibility and toughness. Infrared spectra were obtained using a Perkin-Elmer Model 299B spectrophotometer. The infrared spectrum indicated that the material contained both EPDM and poly(acetylene) moieties. Poly(acetylene) was present in predominantly trans configuration as evidenced by a characteristic infrared absorption band at 1015 cm$^{-1}$. There was no evidence that any poly(acetylene) moieties were grafted onto the unsaturated sites of the EPDM terpolymer. This was corroborated by an extensive extraction experiment using Soxhlet extraction apparatus. Virtually quantitative amounts of EPDM could be extracted from the blend with toluene. IR spectra of the fully recovered EPDM were identical with those of the virgin EPDM.

Electron micrographs were taken of the blend using $OsO_4$ as a staining agent. The poly(acetylene) phase appeared to be discontinuous while the elastomeric material formed the continuous matrix.

Exposure of the films to iodine vapor for 24 hours results in ultimate conductivities of 10–90 ohm$^{-1}$cm$^{-1}$, depending upon poly(acetylene) contents. These conductivities could be increased by several orders of magnitude upon stretching the sample (600% elongation). This increase in conductivity may be attributable to the fact that poly(acetylene) domains were widened and aligned upon stretching the sample. Examination of X-ray data clearly indicated that the degree of crystallinity was increased as the film blend was stretched.

EXAMPLE 2

Crosslinking with Sulfur Monochloride ($S_2Cl_2$)

A blend of EPDM and poly(acetylene) prepared according to Example 1 was crosslinked using sulfur monochloride in a toluene solution. Fifty ml of freshly distilled toluene was placed in an argon-flushed flask. Two ml of sulfur monochloride was subsequently added with a syringe. One to two grams of the blend was introduced into the flask and left for five minutes. The solvent was subsequently decanted and the crosslinked blend was dried in vacuum. The crosslinked blend was then exposed to iodine, and it was found that blends containing more than 2% of the sulfur did not pick up any iodine, even after a 72 hour period.

A similar film was doped with iodine prior to this crosslinking procedure. Subsequently, the doped material having a condudtivity of 60 ohm$^1$cm$^{-1}$ was reacted with sulfur monochloride in a toluene solution for 10 minutes. The color of the solution turned from pale yellow to dark red while the polymer film remained insoluble in the toluene solution. The film lost its conductivity (less than 10$^{-6}$ ohm$^{-1}$cm$^{-1}$) after the sulfur monochloride treatment. This loss of conductivity may be attributable to the fact that sulfur monochloride essentially removes all iodine from the blend. The complete absence of iodine in the blend after sulfur monochloride treatment was shown by elemental analysis.

EXAMPLE 3

Crosslinking with Gamma Radiation

A film prepared according to Example 1 was crosslinked with gamma radiation from a $^{60}$Co source. The blend was placed in a sealed tube with the source and left for a specified time. The dose rate was about 1.32×10$^5$ R/minutes. After 30 minutes, the film became insoluble in toluene, hexane, heptane, pentane, acetonitrile, and nitrobenzene. However, unlike the chemically crosslinked material, the irradiated blend could be doped with iodine to produce a material having a conductivity as high as 100 ohm$^{-1}$cm$^1$. Infrared analysis indicated that only EPDM double bonds participated in the crosslinking reaction. It should also be noted that the conductivities of irradiated EPDM/PA blends upon doping were consistently high regardless of the length of gamma ray radiation. The radiation did not appear to damage the poly(acetylene) units of the blend.

EXAMPLE 4

Conductivity Stability of EPDM/PA Blends

A comparison was made of the conductivity stability of uncrosslinked and a crosslinked EPDM/PA prepared to poly(acetylene). Film strips were placed on a bench top to expose them to ambient air. The conductivity of each film was measured at certain time intervals by the standard four-point probe method.

The results are shown in the FIGURE. The conductivity of the iodine-doped EPDM/PA blend decayed more slowly upon air exposure compared to that of the poly(acetylene). This probably reflected the high oxygen impermeability of EPDM rubber due to its highly saturated character. Crosslinked EPDM/PA blend decayed even slower than that of the uncrosslinked blend. This may be due to the fact that the poly(acetylene) chains are immobilized by tightly crosslinked EPDM networks.

Industrial Applicability

The invention described herein relates to electrically conductive poly(acetylene) blends. Such conductive polymer blends are useful in forming microwave absorbers, electromagnetic shields, lightweight batteries, flexible strain gauges, chemical sensors and switches.

Equivalents

Those skilled in the art will recognize or be able to ascertain, using no more than routine experimentation, many equivalents to the specific embodiments of the invention described herein. Such equivalents are intended to be encompassed by the following claims.

We claim:

1. A method of preparing an electrically conductive polymer blend comprising:
   a. forming an acetylene polymer within a matrix of an elastomer having a low level of unsaturation, said elastomer comprising a copolymer of a monoethylenically unsaturated monomer with a diene; and
   b. doping said acetylene polymer with an electron donor or an electron acceptor to a level sufficient to provide said blend with an electrical conductivity of at least about 10$^{-6}$ ohm$^{-1}$ cm$^{-1}$.

2. A method of claim 1 wherein said acetylene polymer comprises poly(acetylene).

3. A method of claim 2 wherein poly(acetylene) is formed within the matrix of an elastomer having a low level of unsaturation by dissolving said elastomer in a solvent containing an acetylene polymerization catalyst, subsequently removing solvent to form a film of elastomer containing catalyst and thereafter exposing said film to acetylene gas at temperatures sufficient for polymerization to occur within the elastomer film.

4. A method of claim 3 wherein poly(acetylene) is formed within the matrix of an elastomer having a low level of unsaturation by dissolving said elastomer in a solvent containing an acetylene polymerization catalyst, bubbling acetylene gas through such solution and subsequently casting a film of polymer blend from said solution.

5. A method of claim 3 or 4 wherein said polymerization catalyst comprises a mixture of titanium tetrabutoxide and triethylaluminum in a solvent therefor.

6. A method of claim 5 wherein the temperature of polymerization is maintained between about $-78°$ C. and room temperature.

7. A method of claim 1 wherein the elastomer having a low level of unsaturation is ethylene-propylene-diene terpolymer.

8. A method of preparing an electrically conductive crosslinked polymer blend comprising:
   a. forming an acetylene polymer within a matrix of an elastomer having a low level of unsaturation, said elastomer comprising a copolymer of a monoethylenically unsaturated monomer with a diene;
   b. crosslinking said elastomer matrix under conditions which do not damage the poly(acetylene) and employ only the unsaturated double bonds for crosslinking; and
   c. thereafter doping said blend with an electron donor or an electron acceptor to produce an electrical conductivity of at least $10^{-6}$ ohm$^{-1}$ cm$^{-1}$.

9. A method of claim 8 wherein said acetylene polymer comprises poly(acetylene).

10. A method of claim 9 wherein crosslinking is achieved by irradiating said blend with ionizing radiation.

11. A method of claim 10 wherein ionizing radiation comprises gamma rays.

12. An electrically conductive cross linked polymer blend formed by a method of claim 8, 9, or 11.

13. A method of claim 8 wherein the elastomer having a low level of unsaturation is ethylene-propylene-diene terpolymer.

* * * * *